O. KARCHER.
PRESS.
APPLICATION FILED OCT. 21, 1914.
1,131,142.
Patented Mar. 9, 1915.
Fig. 1.
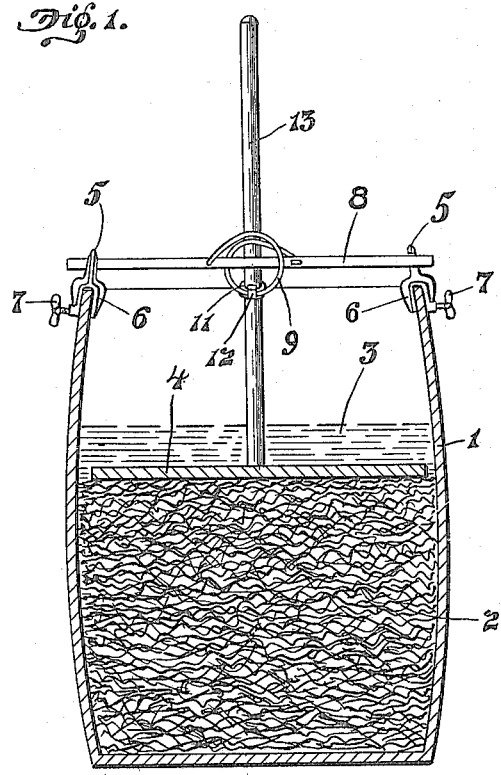
Fig. 2.
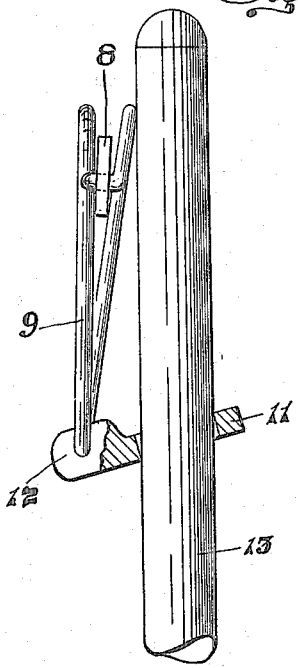
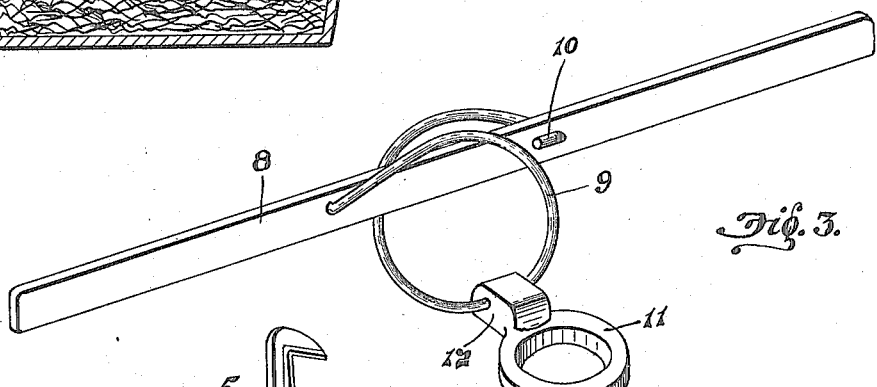
Fig. 3.
Fig. 4.
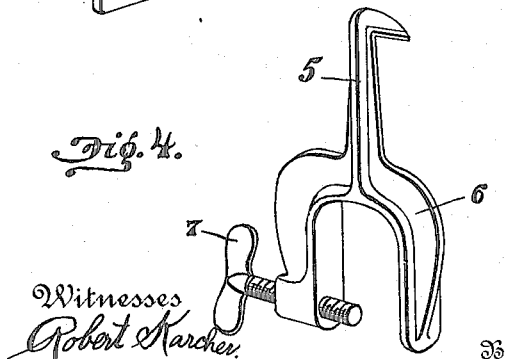
Witnesses
Robert Karcher
J. H. Bishop
Inventor
Otto Karcher
By F. W. Bond.
Attorney

UNITED STATES PATENT OFFICE.

OTTO KARCHER, OF CANTON, OHIO, ASSIGNOR TO FRANCIS X. VOLZER, OF CANTON, OHIO.

PRESS.

1,131,142.  Specification of Letters Patent.  Patented Mar. 9, 1915.

Application filed October 21, 1914. Serial No. 867,779.

*To all whom it may concern:*

Be it known that I, OTTO KARCHER, a citizen of the United States, residing at Canton, in the county of Stark and State of Ohio, have invented a new and useful Press, of which the following is a specification.

My invention relates to improvements in presses, and has more especial reference to a device adapted to compress vegetable or meat which is packed in brine for the purpose of preserving, my device being adapted to keep the vegetable or meat beneath the surface of the brine. It is of course understood that such articles of preserved food as sauer-kraut, pickles, pickled meats and the like must be packed in brine and the food thus packed must be kept beneath the surface of the brine as any part of the food which is allowed to reamin for a time above the surface of the brine will decompose. The usual method of maintaining such articles of food, thus packed, beneath the surface of the brine is to place a plate or the like upon the top of the food and to place a heavy weight, generally a stone upon the top of the plate, the weight thus compressing the food and holding it beneath the surface of the brine. A great deal of difficulty has been experienced with this method as the weight must be lifted from within the interior of the container whenever it is desired to remove a small quantity of the food for use, and as the food is used and the weight is located near the bottom of the receptacle or container in which the food is placed, it is very difficult to reach down into the receptacle for the purpose of removing and replacing the weight.

The object of my invention is to provide a device which does away with the use of a weight and which is simple and inexpensive in construction and is easily and readily attached or detached.

A further object is to provide a device of the character described in which the pressure may be regulated as the occasion requires.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawings: Figure 1 is a longitudinal sectional view of a receptacle showing my press applied thereto. Fig. 2 is an enlarged fragmentary end elevation of my press, parts being broken away for the purpose of illustration. Fig. 3 is a detached perspective view of the mechanism for applying the pressure. Fig. 4 is a detached perspective view of one of the hooks by means of which the device is attached to a receptacle.

Similar numerals of reference indicate corresponding parts throughout the several figures of the drawing.

Referring more especially to the construction illustrated in the accompanying drawing, the numeral 1 indicates a receptacle such as a crock, keg, barrel or the like and is shown as containing a quantity of sauerkraut indicated by the numeral 2, the sauerkraut being preserved in brine indicated by the numeral 3. The usual plate or follower which is placed upon the top of the kraut is indicated at 4; the parts just mentioned are of the usual form and need no further description herein as their specific construction forms no part of the present invention.

A pair of hooks 5 is attached to the upper edge of the receptacle 1, said hooks being placed diametrically opposite to each other as best shown in Fig. 1 of the drawings. These hooks may be of any suitable form and may be applied to the receptacle in any well known manner, but I prefer to form them with a bifurcated portion 6 adapted to straddle the edge of the receptacle, a thumb screw 7 being screw threaded through one of the legs of the bifurcated portion for the purpose of clamping the hook tightly upon the receptacle. The pressure applying mechanism consists of a lever 8 having attached thereto intermediate its ends a circular spring 9, the ends of the spring being passed through suitable apertures in the lever and clenched upon the opposite side as shown at 10. A gripping ring 11 is carried upon the circular spring 9, the spring passing through a suitable aperture in the lug 12 which is provided upon the ring. A plunger 13, preferably formed of wood, is adapted to be located through the gripping ring 11 and to be gripped thereby as hereinafter described.

When it is desired to apply the device to a receptacle the parts are assembled, the plunger resting upon the top of the follower 4. The gripping ring 11 is then located at the desired height upon the plunger 13 according to the amount of pressure desired to be used, and one extremity of the lever 8 is placed beneath one of the hooks 5. Downward pressure is then brought to bear upon the opposite extremity of the lever 8, this pressure tilting the gripping ring as shown in Fig. 2, causing the upper and lower edges of the ring to grip the plunger at points diametrically opposite each other. The opposite extremity of the lever 8 is then brought beneath the other hook 5, holding the plunger firmly upon the follower 4 and keeping all of the kraut beneath the brine as shown in Fig. 1. It is not necessary that the device be operated in exactly this manner as the gripping ring 11 may be placed at any height desired upon the plunger 13 and both extremities of the lever 8 moved down until they can be located beneath the hooks 5. As the tension upon the spring 9 is increased the circular portion of the spring will be decreased in size and when the tension is removed the spring will resume its normal position.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In a device of the character described, the combination with a receptacle and a follower located therein, of a plunger, an adjustable grip mounted upon said plunger, a spring carried by said grip, a lever connected to said spring and means upon said receptacle for receiving the extremities of said lever.

2. In a device of the character described, the combination with a receptacle and a follower located therein, of a plunger, a gripping ring slidably mounted upon said plunger and adapted to grip said plunger when pressure is exerted thereon, a lug located upon said gripping ring and provided with an aperture therethrough, a circular spring located through the aperture in said lug, a lever provided with apertures intermediate its ends, the extremities of said circular spring being passed through said apertures and detachable hooks adapted to be secured upon the upper edge of said container, said hooks adapted to receive the extremities of said lever.

In testimony that I claim the above, I have hereunto subscribed my name in the presence of two witnesses.

OTTO KARCHER.

Witnesses:
J. H. BISHOP,
F. W. BOND.

Copies of this patent may be obtained for five cents each, by addressing the "Commissioner of Patents, Washington, D. C."